Sept. 15, 1925.
E. S. EVANS
1,553,995
DECKING APPARATUS
Filed May 24, 1923
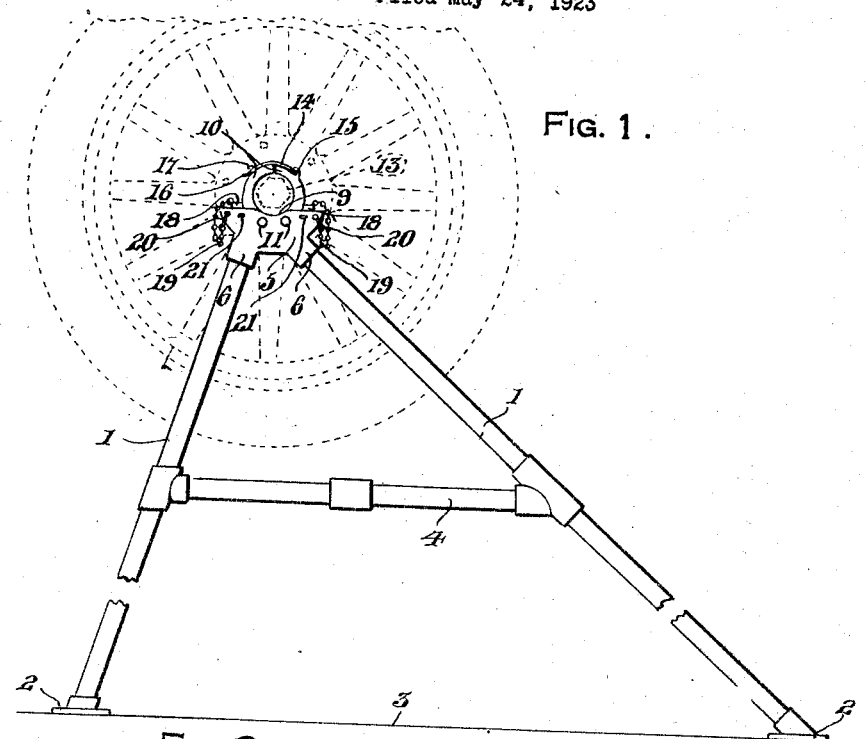
FIG. 1.
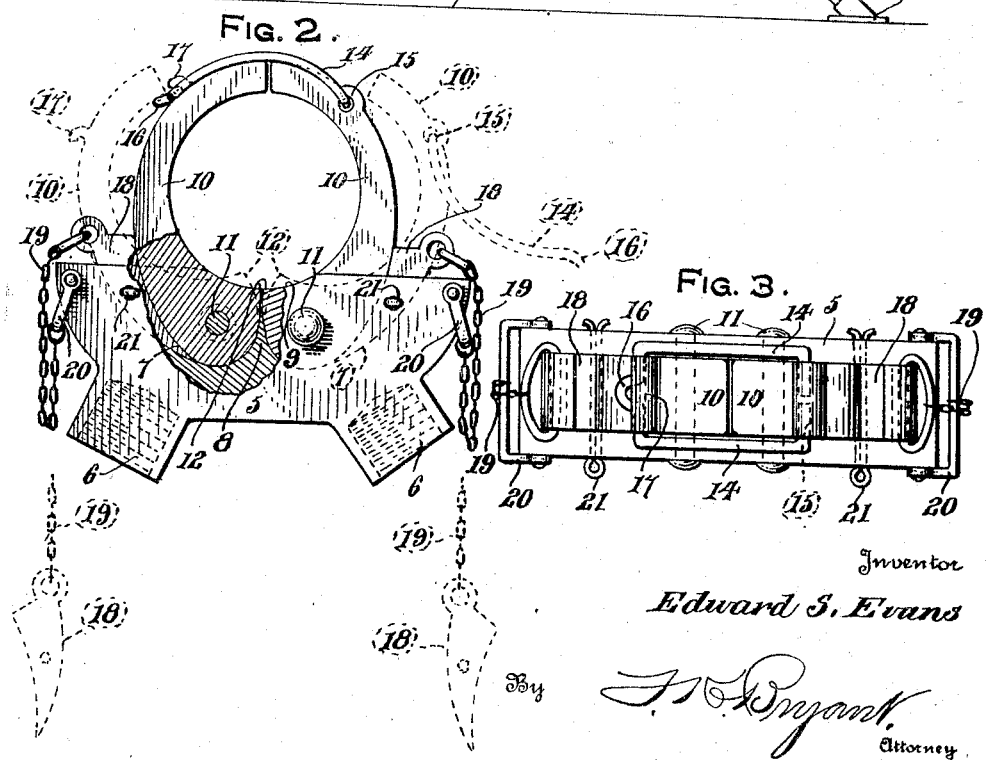
FIG. 2.
FIG. 3.
Inventor
Edward S. Evans
By
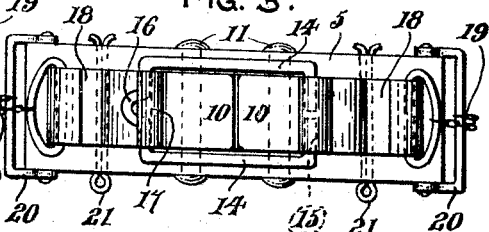
Attorney Patented Sept. 15, 1925.

1,553,995

UNITED STATES PATENT OFFICE.

EDWARD S. EVANS, OF DETROIT, MICHIGAN, ASSIGNOR TO E. S. EVANS & CO., INC., OF DETROIT, MICHIGAN, A CORPORATION OF DELAWARE.

DECKING APPARATUS.

Application filed May 24, 1923. Serial No. 641,188.

*To all whom it may concern:*

Be it known that I, EDWARD S. EVANS, a citizen of the United States of America, residing at Detroit, in the county of Wayne and State of Michigan, have invented certain new and useful Improvements in Decking Apparatus, of which the following is a specification.

This invention relates to certain new and useful improvements in decking apparatus employed in the shipping of motor vehicles and particularly to the head portion thereof and has for its primary object to provide a clamping or locking device associated with the decking head for gripping the hub or axle of an automobile to retain the same in position thereon.

Another object of the invention is to provide a clamping or locking device associated with the head of decking apparatus that is automatic in its operation, the mounting of an automobile upon the decking effecting a closing movement of the locking device while the weight of the automobile retains the locking device in its closed position.

The invention further contemplates in a decking head of the type above set forth, the provision of means cooperating with the decking head and clamping or locking device for retaining the latter in its locked condition and against releasing movement.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view of a decking device equipped with the improved head and locking devices with an automobile wheel illustrated by dotted lines supported therein, Figure 2 is an enlarged side elevational view, partly shown in section of the decking head showing the clamping jaws carried thereby in their locked position, and further illustrated by dotted lines in a released open position with the wedge block cooperating with the decking head and clamping arms for retaining the latter in locked position, and Figure 3 is a top plan view of the decking head.

The decking apparatus disclosed in this application includes a frame structure having supporting legs 1 provided with angularly disposed feet 2 that are suitably anchored upon a car floor 3 or similar support, the legs being connected intermediate their ends by the cross brace 4. The frame structure may be formed of any desired material such as metallic tubing, angle or channel bars or a wooden framework, the head 5 supported at the upper ends of the legs 1 being formed of metal and having threaded sockets 6 for the reception of the upper ends of said legs.

The decking head 5 is preferably cast or forged and is provided in the upper side thereof with a pair of relatively long depressions or sockets 7 separated by an intermediate tongue or partition 8 as shown in Fig. 2, the upper face of the head 5 being concaved as at 9 intermediate the ends thereof.

A substantially semi-circular clamping arm 10 is pivotally mounted in each socket 7, the clamping arms when in closed position as illustrated by full lines in Figs. 1 and 2 forming a circular formation, each clamping arm being of increased cross-sectional area at the pivoted end thereof and being pivotally mounted upon the cross pin 11 extending transversely of the head 5. An offset shoulder 12 is formed on each clamping arm 10 upwardly and laterally of the pivot pin 11 and projects above the central concaved portion 9 of the head when the clamping arms are in open positions as shown by dotted lines in Fig. 2, the pivotal opening movements of the clamping arms being limited by the arms contacting the outer end walls of the sockets 7.

With the clamping arms 10 in their released open positions illustrated by dotted lines in Fig. 2 and accomplished by the normal overbalanced pivotal mountings thereof, an automobile axle or wheel hub 13 illustrated by dotted lines in Fig. 1 is positioned between the clamping arms and in engagement with the offset shoulders 12, the weight of the automobile depressing the shoulders and causing the clamping arm 10 to move upon the pivot pins 11 with the outer ends of the clamping arms moved into enclosing relation with the wheel hub 13. When so disposed, a spring latch 14 pivotally mounted at 15 upon one of the clamping arms has the other end 16 thereof moved into locking engagement with the lug 17 upon the companion clamping arm. A further brake and locking member is provided for each clamping arm 10, a curved wedge block 18 being inserted in the outer end of each socket 7 between the adjacent face of the clamping arm and the end wall of the socket, each wedge block 18 being carried by a chain 19, the other end of which is connected to the adjacent end of the decking head 5 by a link 20. A retaining member 21 passes through registering openings in the side walls of the head socket 7 and the wedge block 18 as shown in Figs. 2 and 3 for retaining the wedges anchored to the head with the clamping arms 10 in rigid engagement with the automobile axle or wheel hub 13.

From the above detail description of the device, it is believed that the construction and operation thereof will at once be apparent, it being noted that the clamping arms 10 are automatic in their operation in that the same are moved to their closed clamping and locking position by the weight of the automobile engaging the lateral shoulders 12 of the cooperating clamping arms for moving the outer ends thereof into enclosing relations with an automobile axle or wheel hub. The clasp 14 retains the outer ends of the clamping arms in closed position while the wedge blocks 18 further bind the same and the locking connection between the wedge blocks and decking head 5 prevents accidental displacement of the wedge blocks. In removing an automobile from the decking, the clasp 14 is released from the lug 17 upon one of the clamping arms and the wedge blocks 18 are removed from the outer ends of the sockets 7, upward movement of the automobile causing the axle or wheel hub to engage the outer ends of the clamping arms 10 and automatically separate the same.

While there is herein shown and described the preferred embodiment of the present invention, it is nevertheless to be understood that minor changes may be made therein without departing from the spirit and scope of the invention as claimed.

What is claimed as new is:—

1. In decking apparatus of the type described, a decking frame, a head at the upper end thereof and a pair of spaced independently operable devices mounted in the head and operable upon direct engagement therewith by a part of an automobile to be moved into clamping engagement with the part of the automobile said devices being adjacently positioned to cause portions thereof engaged by a part of the automobile to contact and limit closing movement.

2. In a decking apparatus of the type described, a decking frame, a head at the upper end thereof, and a pair of spaced independently operable overbalanced clamping devices pivoted in the head and normally assuming an open position and adapted to be moved to a closed clamping position by the weight of a part of an automobile placed directly thereon said devices being adjacently positioned to cause portions thereof engaged by a part of the automobile to contact and limit closing movement.

3. In a decking apparatus of the type described, a decking frame, a head at the upper end thereof, a pair of spaced overbalanced clamping devices normally assuming an open position adapted to be moved to a closed clamping position by the weight of an automobile placed on the head, and means for retaining the clamping means in closed position.

4. In decking apparatus of the type described, a rigid decking frame, a rigid head at the upper end thereof, and a pair of spaced independently operable cooperating clamping arms pivotally mounted in the head, and constructed to have portions adjacent the pivot point and inwardly thereof project above the head when in open position for engagement by a part of an automobile mounted on the head to shift the clamping arms to a closed clamping position by the weight of the automobile.

5. In decking apparatus of the type described a decking frame, a head at the upper end thereof, a pair of spaced cooperating clamping arms pivotally mounted in the head, and constructed to have portions adjacent the pivot point and inwardly thereof project above the head when in open position for engagement by a part of an automobile mounted on the head to shift the clamping arms to a closed clamping position by the weight of the automobile, and separate devices associated with each end of the clamping arms for retaining the same in closed position.

6. In a decking apparatus of the type described, a decking frame, a head at the upper end thereof, and a pair of spaced cooperating clamping arms pivotally mounted in the head, and constructed to have portions adjacent the pivot point and inwardly thereof project above the head when in open position for engagement by a part of an automobile mounted on the head to shift the clamping arms to a closed clamping position by the weight of the automobile, said head being of solid construction and having spaced sockets therein to accommodate the pivotal mounting of the spaced clamping arms.

7. In a decking apparatus of the type described, a decking frame, a head at the upper end thereof, a pair of spaced cooperating clamping arms pivotally mounted in the head, and constructed to have portions adjacent the pivot point and inwardly thereof project above the head when in open position for engagement by a part of an automobile mounted on the head to shift the clamping arms to a closed clamping position by the weight of the automobile, said head being in the form of a block having sockets therein to accommodate the pivotal mounting of the clamping arms, and wedge blocks inserted in the outer ends of the sockets engaging the clamping arms for retaining the same in closed position.

8. In a decking apparatus of the type described, a decking frame, a head at the upper end thereof, a pair of spaced cooperating clamping arms pivotally mounted in the head, and constructed to have portions adjacent the pivot point and inwardly thereof project above the head when in open position for engagement by a part of an automobile mounted on the head to shift the clamping arms to a closed clamping position by the weight of the automobile, said head being in the form of a block having sockets therein to accommodate the pivotal mounting of the clamping arms, wedge blocks inserted in the outer ends of the sockets engaging the clamping arms for retaining the same in closed position, and means for retaining the wedge blocks in the head sockets.

In testimony whereof I affix my signature.

EDWARD S. EVANS.